J. R. McCLENAHAN.
TRAP.
APPLICATION FILED MAR. 28, 1913.
1,079,944.
Patented Dec. 2, 1913.
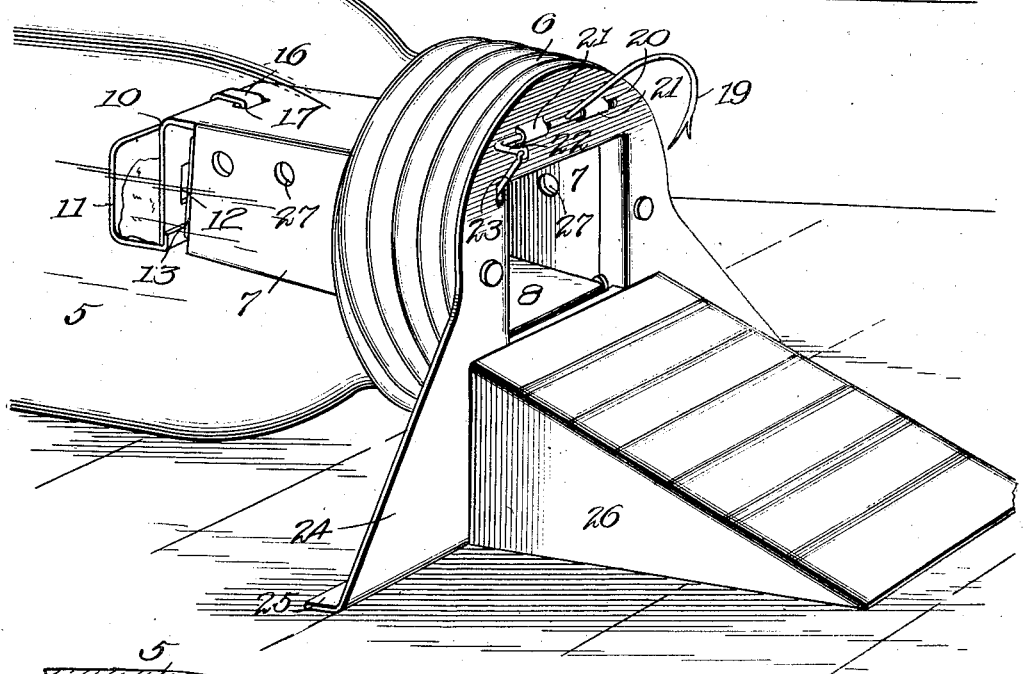
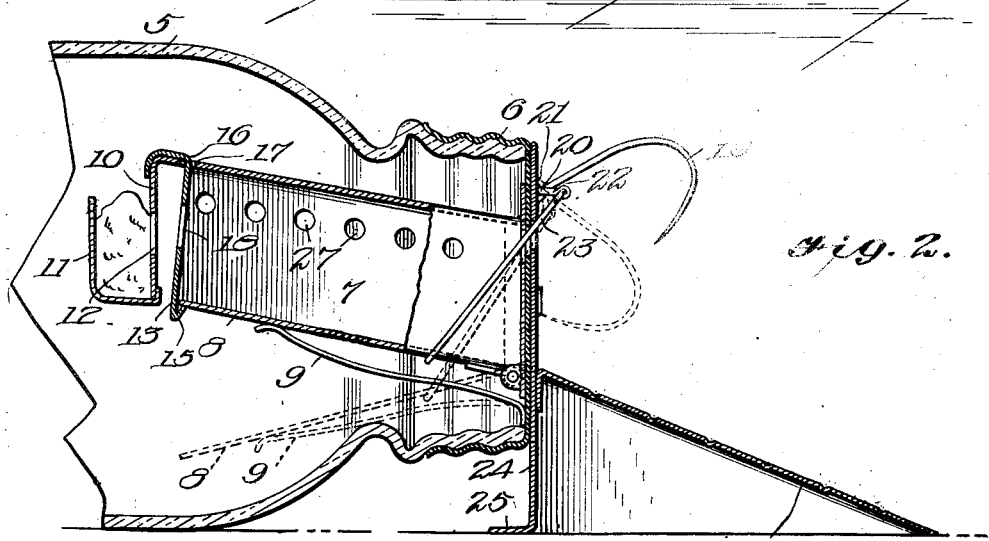
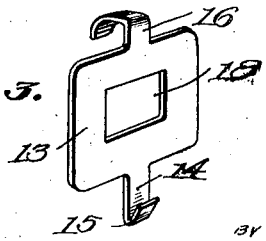
WITNESSES
INVENTOR
John R. McClenahan
Attorney

UNITED STATES PATENT OFFICE.

JOHN R. McCLENAHAN, OF GENEVA, ILLINOIS.

TRAP.

1,079,944.  Specification of Letters Patent.  Patented Dec. 2, 1913.

Application filed March 28, 1913. Serial No. 757,406.

*To all whom it may concern:*

Be it known that I, JOHN R. MCCLENAHAN, a citizen of the United States, residing at Geneva, in the county of Kane and State of Illinois, have invented certain new and useful Improvements in Traps, of which the following is a specification.

This invention relates to traps for catching mice, rats and other vermin, and its object is to provide a simple and efficient trap which is so constructed that an ordinary fruit jar may be employed for the receiving chamber.

The invention also has for its object to provide a trap which can be easily sterilized.

These objects are attained by means of a novel combination and arrangement of parts to be hereinafter described and claimed, reference being had to the accompanying drawing, in which—

Figure 1 is a perspective view of the trap. Fig. 2 is a sectional view of the main body of the trap with the catching portion partly in section. Fig. 3 is a perspective view of the trigger hereinafter referred to.

Referring specifically to the drawing the main body of the trap is a glass jar 5. An ordinary fruit jar may be employed. Such jars are usually provided with a screw cap for closing the same. This cap is removed and there is substituted for the same a screw cap 6 provided with means for trapping the animal. As shown, the cap has a central opening from which extends a tube 7 which is closed at its outer end and has a bottom 8 which is a tilting platform. The tube extends from the inner side of the cap so that it projects into the jar when the cap is screwed thereon. The platform 8 is engaged by a light spring 9 which normally holds it closed. The weight of the animal on the platform causes the latter to tilt, whereupon the animal is precipitated into the jar, and the platform then immediately swings back and closes.

The outer end wall 10 of the tube 7 carries a bait holding shelf 11, said shelf being located behind said wall, and the latter having an opening 12 to expose the bait supported on the shelf. The bait is thus located exteriorly of the tube 7.

The platform 8 is held stationary by means of a trigger 13 comprising a plate which extends across the rear end of the tube 7 and has a depending reduced portion 14 terminating in a hook 15, the latter engaging the forward edge of the platform. From the top edge of the plate projects a reduced portion 16 which is hook-shaped and extends through an aperture 17 in the top of the tube in which it loosely seats, the hook extending over the end wall of the tube. This provides a hinge or pivotal support for the plate, so that it may swing in a direction to let go of the platform and allow the latter to tilt to precipitate the animal into the jar. The trigger plate 13 has an opening 18 which registers with the opening 12, so that the animal may reach for the bait on the shelf 11. The trigger plate by its weight will normally swing to holding position. The opening 18 is slightly higher than the opening 12.

In operation, the animal approaches the bait on the shelf 11 from within the tube 7, and in order to reach the bait will have to push his nose through the openings 18 and 12, and in doing this he will push the trigger plate 13 back, thus disengaging the hook 15 from the free end of the platform 8, and releasing the latter. The weight of the animal on the platform then causes the latter to tilt and the animal is precipitated into the jar, after which the platform is immediately swung back and closed by the spring 9.

In order to cut off the retreat of the animal, there is pivoted to the outer face of the cap 6 a hook-shaped prong 19, the same projecting from a rock-shaft 20 journaled under lugs 21 bent up from the cap. One end of the rock-shaft has a crank bend 22 to which is loosely connected a rod 23, which extends through an aperture in the cap and passes along one side of the tube 7 down to the platform 8, to which latter it is secured. Thus, when the platform starts to tilt, the prong 19 swings into the entrance end of the tube 7 and serves as a barrier to prevent escape of the animal. The prong 19 is normally above the entrance end of the tube 7, so as not to interfere with the animal passing thereinto. Should the animal try to retreat backward, the platform 8 will remain in depressed position as the spring 9 is very light. Thus, the prong remains projecting into the entrance end of the tube to cut off escape. The animal upon attempting to escape will come in contact with the sharp prongs which will cause him to leap forward into the jar.

To the outer face of the cap 6 is secured a plate 24 having an enlarged and widened portion which projects from the cap and serves as a base for supporting the jar, which latter is laid on its side when the trap is set for operation. The edge of the widened portion of the plate has a lateral flange 25 which engages the floor or other support on which the jar may be placed, and thereby holds the jar steady and prevents it from rolling.

From the plate 11 extends a slanting runway 26 which leads to the central opening in the cap 6 from which the tube 7 extends.

All the parts, except the jar 5, are of metal, so that the trap can be easily and thoroughly cleaned after it has been used. The trapping parts are all carried by the cap 6 and are removable therewith from the jar, so that they can be placed in hot water to destroy all taint. In a similar manner the jar can be cleaned, or if it should get broken, it can be readily replaced. The cap 6 will be made in standard sizes to fit ordinary Mason fruit jars.

In the tube 7 are perforations 27, so that water may be poured into the jar 5, to drown the entrapped animal, after placing the jar in upright position.

I claim:

1. In an animal trap, a removable closure for the trap, a tube extending from the closure and having a tiltable bottom platform, the rear end wall of the tube having an opening, a bait support behind said end wall and accessible through the opening in the end wall, and a swinging trigger engageable with the platform for holding the same stationary, said trigger including a plate which extends across the tube adjacent to the aforesaid end wall, and said trigger plate having an opening which registers with the opening of said end wall.

2. In an animal trap, a removable cap for closing the trap, said cap having an entrance opening, a tube extending from the opening and having a tilting bottom, said tube being located on one side of the cap, and a plate secured to the other side of the cap, and provided with an opening registering with the cap opening, said plate having an enlarged and widened portion projecting from the cap and serving as a supporting base for the trap.

In testimony whereof I affix my signature in presence of two witneses.

JOHN R. McCLENAHAN.

Witnesses:
W. H. GIBSON,
WALTER LITTLE.